United States Patent
Shepherd

[11] 3,942,375
[45] Mar. 9, 1976

[54] METHOD AND MEANS FOR TESTING HYDRAULIC PUMP

[76] Inventor: J. D. Shepherd, R.R. 2, P.O. Box 248, Lenos, Iowa 50851

[22] Filed: Oct. 11, 1974

[21] Appl. No.: 514,138

[52] U.S. Cl. .................................................. 73/168
[51] Int. Cl.² ........................................ G01M 19/00
[58] Field of Search ...................... 73/168, 134, 133

[56] References Cited
UNITED STATES PATENTS

| | | | |
|---|---|---|---|
| 2,172,095 | 9/1930 | White ................................... | 73/112 |
| 2,924,971 | 2/1960 | Schroeder et al. ..................... | 73/168 |
| 2,981,099 | 4/1961 | Lapp ..................................... | 73/134 |
| 3,347,093 | 10/1967 | Hauck .................................. | 73/168 |

Primary Examiner—Richard C. Queisser
Assistant Examiner—Marcus S. Rasco
Attorney, Agent, or Firm—Zarley, McKee, Thomte & Voorhees

[57] ABSTRACT

The testing method and means of the present invention utilizes a conventional dynamometer for testing a hydraulic pump. The dynamometer is used to mechanically drive the pump and the hydraulic system of the dynamometer is used to supply the test pump with hydraulic fluid. A flow rater is connected to the tested pump for registering the pressure, flow rate, and temperature of the fluid being pumped by the test pump.

8 Claims, 3 Drawing Figures

U.S. Patent   March 9, 1976   3,942,375
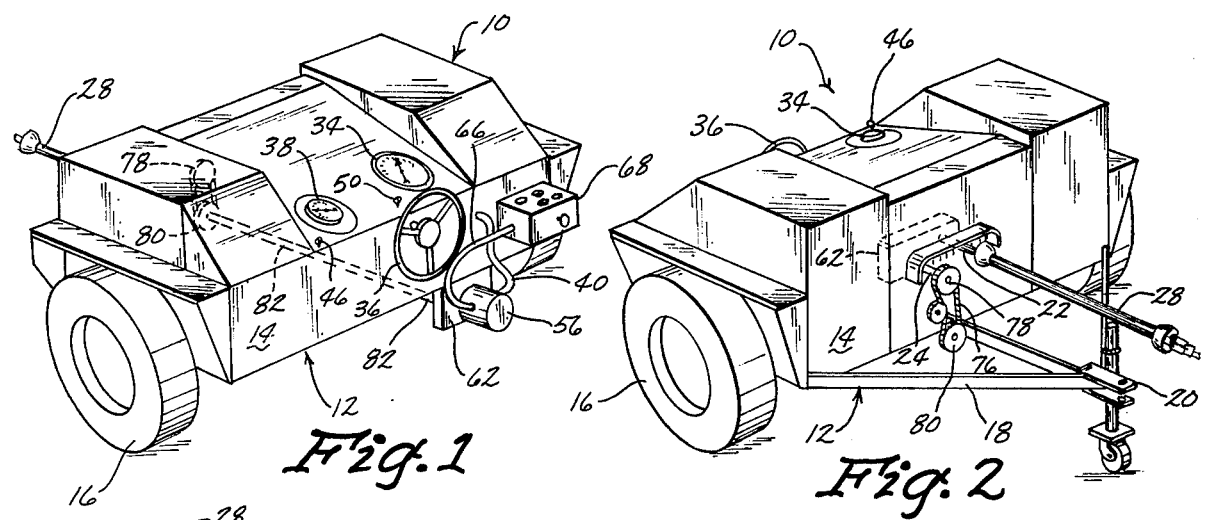
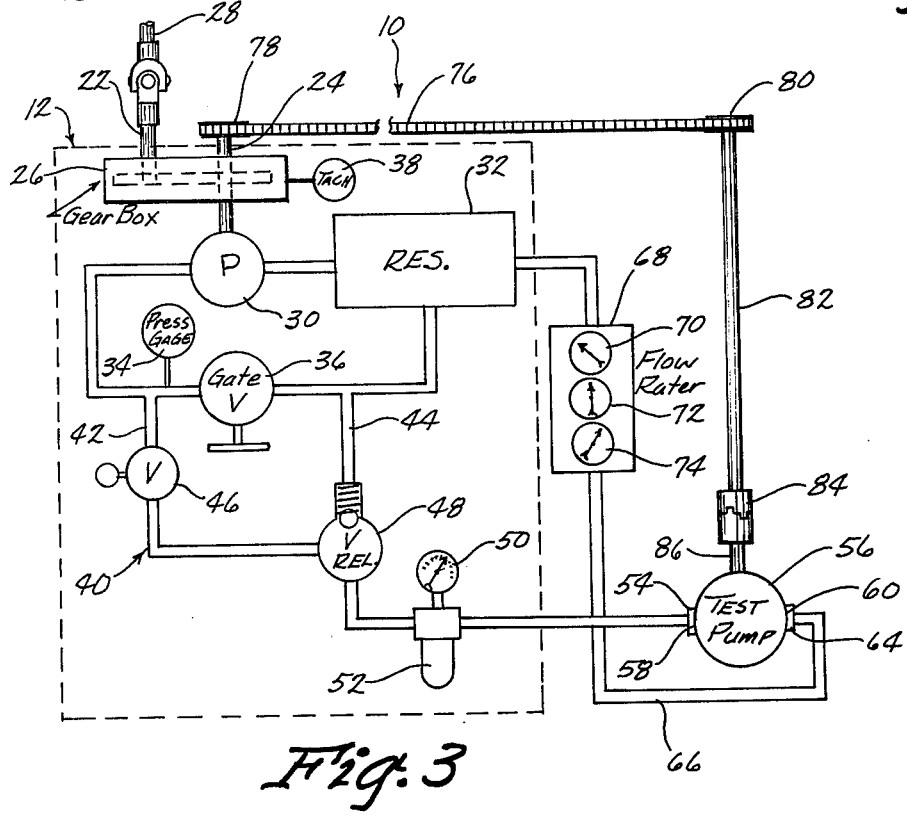

METHOD AND MEANS FOR TESTING HYDRAULIC PUMP

SUMMARY OF THE INVENTION

This invention relates to a method and means for testing hydraulic pumps.

The testing of hydraulic pumps involves complicated and cumbersome equipment for supplying the hydraulic fluid to the pump and for registering the effiency of the pump. Furthermore, carefully controlled means must be provided for driving the test pump during testing.

The present invention utilizes a dynamometer for supplying the hydraulic fluid and for driving the test pump. Dynamometers are normally utilized for measuring the horsepower or torque output of driven shafts. A typical example of the use of a dynamometer is the testing of farm tractors. The dynamometer is attached to the power takeoff shaft of the tractor so that the tractor drives a shaft within the dynamometer. The drive shaft of the dynamometer drives a dynamometer pump in a dynamometer hydraulic circuit. By varying the resistance within the hydraulic circuit, it is possible to measure the effect on the performance of the tractor engine.

The present invention utilizes the dynamometer to drive a test pump and also utilizes the dynamometer hydraulic circuit to supply the hydraulic fluid to the test pump. The various gauges and meters on the dynamometer may be used to evaluate the performance of the test pump. In addition, a flow rater is inserted into the hydraulic circuit with the test pump so as to further measure the performance of the test pump. The dynamometer is driven by the power takeoff of a tractor or by other suitable power means.

Therefore, a primary object is the provision of a method and means for testing hydraulic pumps.

A further object of the present invention is the provision of a device which utilizes the hydraulic circuitry, gauges, and drive mechanism of the dynamometer.

A further object of the present invention is the provision of a device which requires only slight modification of the dynamometer in order to rest a hydraulic pump.

A further object of the present invention is the provision of a device which does not interfere with the capability of the dynamometer to perform its normal horsepower and torque measurement capabilities.

A further object of the present invention is the provision of a device which is simple in construction.

A further object of the present invention is the provision of a device which can test both radial piston pumps and gear pumps.

A further object of the present invention is the provision of a device which can vary the charge pressure of the pump being tested from neutral to any level desired.

A further object of the present invention is the provision of a device which is economical to manufacture and durable in use.

BRIEF DESCRIPTION OF THE VIEWS OF THE DRAWINGS

The invention consists in the construction, arrangements and combination of the various parts of the device, whereby the objects contemplated are attained as hereinafter more fully set forth, specifically pointed out in the claims, and illustrated in the accompanying drawing in which:

FIG. 1 is a perspective view of the dynamometer modified to test a hydraulic pump.

FIG. 2 is a rear perspective view of the device shown in the FIG. 1.

FIG. 3 is a schematic diagram of the hydraulic circuitry and mechanical drive train of the device shown in FIGS. 1 and 2.

DETAILED DESCRIPTION

Referring to the drawings, the numeral 10 generally designates the testing device of the present invention. A dynamometer 12 is shown modified for use with the present invention. An example of a dynamometer which may be utilized for the present invention is the model T-2000 manufactured by M & W Gear Company, Gibson City, Ill. 60936. This dynamometer includes a frame 14 mounted on wheels 16 and having a tongue 18 and hitch 20 which permit transporting of the dynamometer to the device being tested. The dynamometer includes first and second drive shafts 22, 24 which extend from gear box 26. Shaft 22 is normally adapted to be connected to the power takeoff shaft 28 of a conventional tractor. Gear box 26 connects shaft 24 to shaft 22 in a predetermined ratio which normally causes shaft 24 to rotate at the same rpm at the speed of the tractor engine. However, this ratio may be varied without detracting from the invention.

Before modification for the purpose of the present invention, dynamometer 12 includes a hydraulic dynamometer pump 30 which is driven by shaft 24 and which is included in a hydraulic circuit including a reservoir 32, a pressure gauge 34, and a gate valve 36. Also, a tachometer 38 is associated with gear box 26 to register the rpms of shaft 24.

The above referred to structure is conventionally found in dynamometers. The dynamometer is modified for purposes of the present invention by connecting a charge line 40 into the hydraulic circuit of the dynamometer. Charge line 40 includes two branches 42, 44 each of which is connected into the hydraulic circuit on opposite sides of gate valve 36. A spool valve 46 is mounted in branch 42. At the juncture between branches 42, 44 is a pressure release valve 48 which is preferably adjustable. Beyond pressure release valve 48 is a charge pressure gauge 50 having a filter 52 associated therewith. Charge line 40 includes a coupling 54 adapted to be connected to a test pump 56.

Test pump 56 includes a charge opening 58, a discharge opening 60, and a rotor shaft (not shown) which may be rotated to operate test pump 56. A mounting member 62 is provided on the front of dynamometer 12 for temporarily mounting test pump 56 during the testing thereof.

Connected to discharge opening 60 of test pump 56 is a coupling 64 of a return line 66. Mounted within return line 66 is a flow rater 68 having three gauges 70, 72, 74 for registering gallons per minute, temperature and pressure of the fluid passing through return line 66. While various types of flow raters are available in the art, an example of the satisfactory flow rater is a device made by Nuday Company, Detroit, Michigan. model ND-1575.

Return line 66 is connected to reservoir 32 so that the fluid from test pump 56 progresses through flow rater 68 and back into reservoir 32 of the dynamometer.

The dynamometer is also used to drive test pump 56. A chain 76 is trained around a sprocket 78 mounted on shaft 24 and is also trained around a sprocket 80 on the end of a pump shaft 82 which extends beneath dynamometer 12 to a flexible coupling 84. A stub shaft 86 extends from flexible coupling 84 and is temporarily connected to the rotor shaft (not shown) of test pump 56. Thus, rotation of shaft 24 of dynamometer 12 causes the rotor of test pump 56 also to be driven to cause test pump 56 to perform. While the rotational speed of test pump 56 may be varied depending upon the size sprocket used in the drive train, it is preferable to rotate pump 56 at the same speed as shaft 24 of the dynamometer. This will enable the operator to read the dynamometer tachometer to determine the exact speed at which test pump 56 is being driven.

In normal operation of the dynamometer, spool valve 46 is closed so as to render the modified circuitry of the present invention inoperable. In this condition the dynamometer may function for its normal purposes to determine the horsepower of a driven shaft such as shaft 28.

However, when it is desired to test a hydraulic pump, the pump 56 is mounted on mounting member 62 and lines 40, 66 are connected to the charge opening 58 and discharge 60, respectively. Stub shaft 86 is connected to the rotor of the test pump 56.

Next, gate valve 36 is closed and spool valve 46 is opened so as to direct hydraulic fluid through charge line 40. Pressure relief valve 48 functions to protect dynamometer pump 30 in the event of undue pressure in line 40. In the event that the pressure builds up beyond a predetermined pressure, pressure relief valve 48 redirects the excess fluid through branch 44 back to reservoir 32. Charge pressure gauge 50 registers the pressure of the fluid being delivered to test pump 56. In the case of radial piston pumps, it is desired to deliver a charge pressure to the test pump. Other types of pumps may require no charge pressure at all. The particular pressure delivered to test pump 56 may be varied by adjusting pressure relief valve 48.

First draft shaft 22 is connected to a power source such as a conventional power takeoff shaft 28 of a farm tractor. Rotation of shaft 22 causes rotation of shaft 24, which through chain 76, shaft 82 and stub shaft 86 causes rotation of the rotor of test pump 56. As soon as test pump 56 begins operating, the various pressures, temperatures and flow rates, will be registered on flow rater 68. The pump may be tested for its efficiency at various rpms, with the rpms being readily determined by tachometer 38 of dynamometer 12.

From the foregoing it can be seen that a method and means are provided for testing the hydraulic pump. The method of the present invention utilizes the hydraulic circuitry, gauges, and drive mechanism of a conventional dynamometer. Only slight modification of the dynamometer is required, and there is no interference with the capability of the dynamometer to perform its normal horsepower measurement functions. The device is simple in construction and is capable of testing both radial piston and gear pumps. It is possible to vary the charge pressure of the pump being tested from neutral to any level desired. Thus it can be seen that the device accomplishes at least all of its stated objectives.

What is claimed is:

1. A device for testing a hydraulic pump having a charging inlet, a discharge outlet, and a rotor shaft, said device comprising:

a dynamometer comprising a drive shaft, a dynamometer pump, and means connecting said drive shaft to said dynamometer pump for driving said dynamometer pump, said dynamometer pump being hydraulically connected in a hydraulic circuit for pumping hydraulic fluid through said circuit in response to rotation of said drive shaft;

a tachometer connected to said drive shaft for measuring the rotational speed thereof;

a first conduit connected to said hydraulic circuit of said dynamometer, said first conduit having first coupling means thereon for coupling said conduit to said charging inlet of said test pump;

a second conduit connected to said dynamometer hydraulic circuit for returning fluid to said dynamometer circuit, said second conduit having a second coupling means for connecting said second conduit to said discharge end of said test pump;

a flow rater connected to said second conduit and having gauges for registering the rate of flow of fluid in said second conduit; and mechanism connected to said drive shaft of said dynamometer and having means adapted to be connected to said rotor shaft of said test pump for driving said test pump in response to rotation of said drive shaft of said dynamometer.

2. A device according to claim 1 wherein valve means are in said first conduit for regulating the rate of fluid flow from said dynamometer pump to said test pump.

3. A device according to claim 2 wherein said valve means comprise a pressure relief valve having an overflow outlet adapted to discharge fluid which is introduced to said pressure relief valve at a rate greater than a preselected rate, means connecting said overflow outlet to said dynamometer hydraulic circuit.

4. A device according to claim 3 wherein said pressure relief valve includes adjustment means for selectively varying said preselected rate of flow.

5. A device according to claim 4 wherein gauge means are connected to said first conduit between said pressure relief valve and said test pump for registering the pressure of fluid being introduced to said test pump.

6. A method for testing a hydraulic test pump having a charging inlet, a discharge outlet, and a rotor shaft, said method comprising:

connecting a dynamometer drive shaft to a rotational power source, so as to drive a hydraulic pump within said dynamometer; said dynamometer having a tachometer for registering the rotational speed of said drive shaft;

priming the charging inlet of said test pump with hydraulic fluid from said dynamometer hydraulic circuit, mechanically connecting said rotor shaft of said test pump to said drive shaft of said dynamometer whereby said rotor shaft will be rotated in response to rotation of said drive shaft;

measuring and registering the rate of flow of fluid exiting from said test pump, measuring the rotational speed of said test pump with said tachometer of said dynamometer;

returning the fluid exiting from said test pump to the hydraulic circuit of said dynamometer pump;

comparing the rotational speed of said test pump with the rate of flow of fluid exiting from said pump to determine the efficiency of said pump.

7. A method according to claim 6 comprising regulating the pressure of fluid from said dynamometer pump to said charging inlet of said test pump at a predetermined charge pressure.

8. A device according to claim 5 wherein said mechanism comprises a gear box within said dynamometer drivingly connected to said drive shaft and having a second drive shaft, a first sprocket on said second drive shaft, a pump shaft rotatably mounted to said dynamometer and having a second sprocket thereon, a drive chain trained around said sprockets for transferring rotational movement from said first mentioned drive shaft to said pump shaft.

* * * * *